G. T. HACKLEY.
PRESSURE GAGE.
APPLICATION FILED OCT. 23, 1911.
1,061,472.
Patented May 13, 1913.
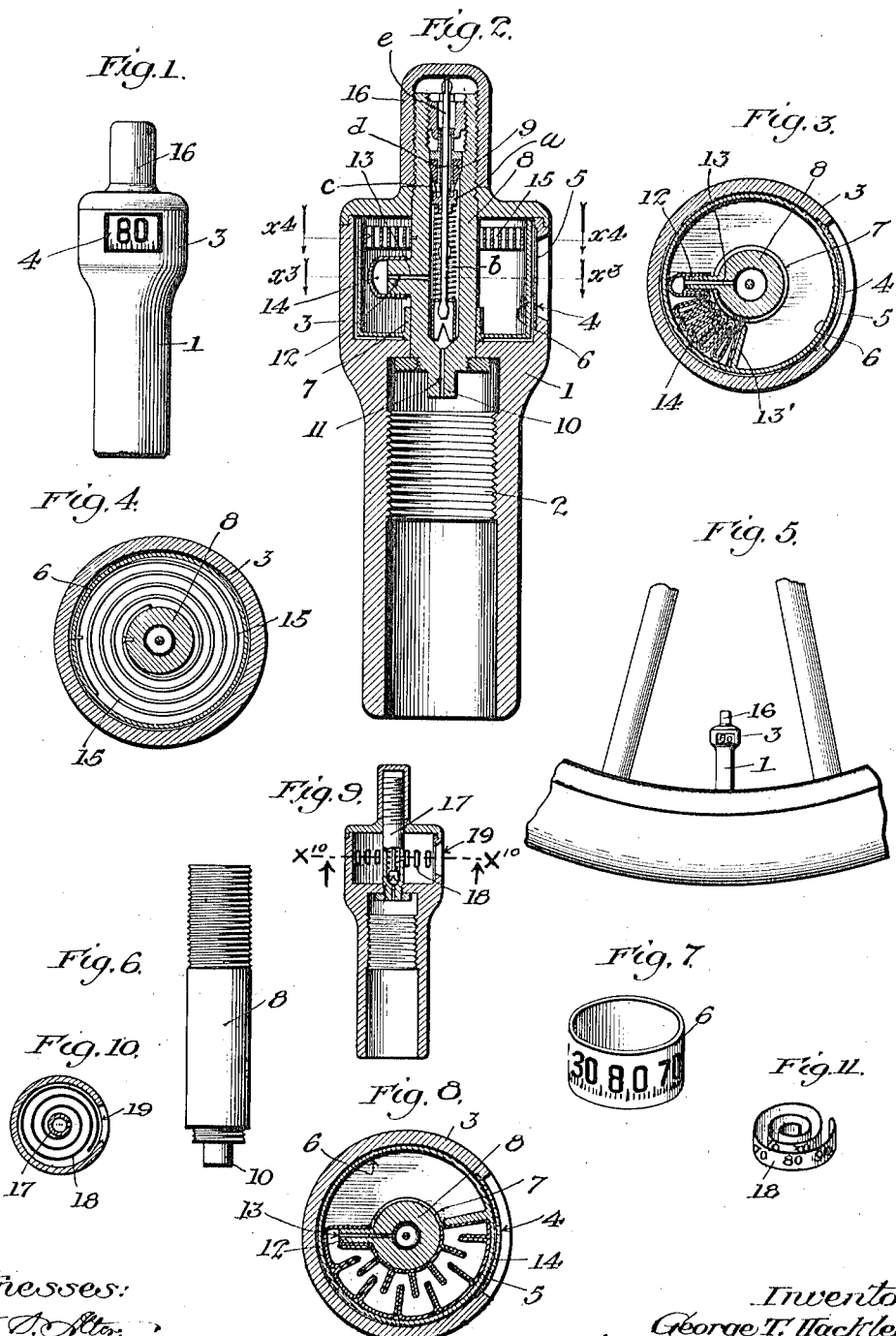

UNITED STATES PATENT OFFICE.

GEORGE T. HACKLEY, OF LOS ANGELES, CALIFORNIA.

PRESSURE-GAGE.

1,061,472.   Specification of Letters Patent.   Patented May 13, 1913.

Application filed October 23, 1911.   Serial No. 656,337.

*To all whom it may concern:*

Be it known that I, GEORGE T. HACKLEY, a citizen of the United States, residing at Los Angeles, in the county of Los Angeles, State of California, have invented a new and useful Pressure-Gage, of which the following is a specification.

This invention relates to pressure gages especially adapted for use on pneumatic tires, and the object of the invention is to provide a gage which may be attached to the valve of the pneumatic tire and remain attached thereto while the tire is in use, the gage being so constructed that it will indicate at all times the pressure of the air in the tire.

The important and novel feature of the invention is that the indicating member is rotatable and arranged with its axis longitudinal to the valve. That is to say, the axis of rotation of the indicating member is radial to the wheel on which the tire is carried when the gage is in use. The advantages attained by this are that the centrifugal force produced by the rotation of the wheel acts longitudinally of the axis of the rotating member. The end thrust to which the rotating indicating member is subjected does not interfere with its accuracy as all parts are subjected uniformly to the same action. Another advantage of this construction is that it is possible to employ an indicating member on which numerals representing the pressure may be printed in large type so as to be easily readable from a considerable distance. This construction of indicating member enables the use of a rotating indicating member with largest figures in the smallest and most compact form, and permits the tire to be inflated through the center of the gage without requiring the removal of the gage, and avoiding the objectionable features of a laterally projecting inlet stem.

Referring to the drawings: Figure 1 is a side elevation of the invention. Fig. 2 is a longitudinal cross-section through the device, on an enlarged scale. Fig. 3 is a cross-section on line $x^3$—$x^3$ Fig. 2. Fig. 4 is a section on line $x^4$—$x^4$ Fig. 2. Fig. 5 is a side elevation of a portion of a wheel and tire equipped with the gage. Fig. 6 is a side elevation in detail of the valve casing. Fig. 7 is a perspective in detail of the indicating member. Fig. 8 is a view similar to Fig. 3 showing the indicating member partially turned by the extension of the expansion member. Fig. 9 is a view similar to Fig. 2, of a modification. Fig. 10 is a section on line $x^{10}$—$x^{10}$ of Fig. 9 showing the spiral indicating member expanded to indicate the highest pressure. Fig. 11 is a perspective of the pressure operated indicating member.

1 designates the tubular barrel of the gage, which is provided with interior threads 2 adapted to be screwed to the valve of the tire not shown. The barrel 1 has an enlarged head 3 with a sight opening 4 closed by a transparent panel 5, and arranged within the head 3, concentric therewith, and rotatable with its axis longitudinal to the barrel 1 is an indicating drum 6 with a hub 7 which is journaled on a conduit 8 which extends longitudinally and centrally through the head 3 and contains a valve 9 of any suitable construction, which will permit air to pass inwardly through the conduit 8 into the tire but normally prevents its outward passage therethrough. The valve herein shown is in universal use and of well known construction, the sliding valve $a$ being yieldingly held by a spring $b$ against the stationary valve seat $c$ and preventing escape of air through passage $d$. By depressing valve stem $e$ to which the valve $a$ is rigidly attached, the valve $a$ is moved away from its seat and air can then escape through the passage $d$ or can be pumped into the tire through the passage $d$, the cap 16 having first been removed. The lower end of the conduit 8 has an extension 10 for depressing the valve stem of the tire valve not shown, and is provided with a central air passage 11 which places the interior of the conduit 8 into communication with the space within the tire. The extention 10 need not be employed when the tire valve is removed from the tire as the valve 9 is sufficient. However in some cases it may be desirable to apply the gage to a tire without removing the valve from the tire, in which case the extension 10 is useful. The conduit 8 has a lateral abutment 12 with a branch air passage 13 leading from the interior of the conduit 8, and an expansible means is arranged in communication with the branch air passage and engages an abutment 13' Fig. 3 which projects inward from the indicating drum 6. Primarily, the conduit is necessary to conduct air into the tire and to conduct air from the tire to the branch 13, and thence to the expansible means. Secondarily, it acts as a casing for the valve, but the valve is not essential to the invention though it is advantageous. In the present form the expansion means consists of a hollow, non-stretchable tape 14 which is air tight and is arranged with several convolutions. A helical spring 15 is arranged within the drum 6, one end of the spring being attached to the drum and the other end being attached to the conduit 8, as clearly shown in Fig. 4, the spring 15 exerting a constant tension on the drum 6 tending to hold the abutment 13' toward the abutment 12. The hollow tape 14 being in constant communication with the interior of the conduit 8 causes the pressure within the tape 14 to correspond to that which is within the tire and the coils of the tape will be expanded accordingly and in proportion to the resistance presented by the spring 15 and the drum 6 will be rotated a corresponding distance. The tension of the spring 15 is such that when the maximum pressure which the gage is to register is in the tire this pressure will be sufficient to expand the hollow tape, which, acting against the abutment 13' will rotate the drum 6 and overcome the spring 15 to the point where the largest numeral on the indicator appears to view through the sight opening 5. When the pressure in the tire falls the spring 15 will retract the indicating drum 6 and correspondingly collapse the tape, bringing the corresponding numeral of the indicating drum into view at the sight opening 5. When the pressure in the tire is at the minimum which the gage will register, or at any point below that, the smallest indicating numeral of the indicating drum will stand in view.

The conduit 8 protrudes above the head 3 and is covered with a dust-cap 16 which may be removed at any time to enable a hose from the air supply to be attached to inflate the tire. As air is thus introduced and the pressure rises in the tire the indicating drum 6 will gradually turn as the pressure increases, bringing the successive numerals into view at the sight opening, so that when the desired degree of pressure is reached it is shown at a glance and further inflation stopped. This enables the tire to be quickly and accurately inflated.

Figs. 9, 10 and 11 represent a modified form in which an indicating member comprising a helical hollow spring wire 18 is employed, the inner end of which is in communication with the central conduit 17 and the outer end of the hollow wire is closed. Indicating numerals are placed on the outer surface of the indicating member and show through the sight opening 19.

The hollow indicating member 18 shown in detail in Fig. 11 stands normally when not under pressure with its coils contracted. When the air pressure is admitted to the curved coils the pressure causes them to assume larger arcs which results in moving around the free end of the wire and bringing a corresponding numeral into view through the sight opening. In Fig. 10 the indicating member is shown in expanded position to indicate the highest pressure. The advantage of this form is its simplicity and direct action with fewest possible parts.

What I claim is:—

1. A barrel adapted to be screwed to the valve of a tire, an indicating drum rotatable in said barrel with its axis longitudinal with the barrel, the barrel having a sight opening and the indicating drum having numerals visible consecutively through said opening, means for conducting air through said drum, and means communicating with said air conducting means and responsive to the air pressure in the tire for rotating said indicating drum.

2. A barrel, a conduit in the upper portion of said barrel and protruding above the barrel for the attachment of inflating means, a valve in said conduit, there being an annular space formed between said conduit and the wall of said barrel, pressure operated indicating means movable circularly in said space and provided with indicating marks, said barrel having a sight opening for revealing a portion of the indicating means.

3. A pressure gage comprising a barrel, a drum revoluble therein, a conduit extending into the barrel through the drum, pressure operated means within the drum communicating with the conduit for revolving the drum when pressure is applied, the barrel having a sight opening and the drum having indicating numerals which are consecutively brought into view in the sight opening when the drum is revolved.

4. A pressure gage comprising a barrel having a socket adapted to fit over and forming a housing for the valve nipple of the pneumatic tire, means for attaching said socket on the valve nipple, said barrel having a chamber above said socket, the side wall of said chamber having a sight opening, pressure operated indicating means in said chamber with numerals, the indicating means being circularly movable to move said numerals consecutively into position in register with said sight opening, a conduit extending through the upper wall of said chamber through said pressure operated indicating means and communicating with said socket, and means in the upper end of said socket for depressing the valve stem of the valve in the tire.

5. A pressure gage comprising a barrel, a drum revoluble in said barrel and having indicating numerals on its outer surface, the barrel having a sight opening to reveal the indicating numerals, a conduit extending through said drum, and communicating with a source of pressure, a hollow extensible member movable within the barrel around the conduit, said hollow extensible member communicating with said conduit and having a connection with the drum for turning the drum.

In testimony whereof, I have hereunto set my hand at Los Angeles, California, this 17th day of October, 1911.

GEORGE T. HACKLEY.

In presence of—
  F. A. CRANDALL,
  GLADYS RUSSELL.